US005662573A

United States Patent [19]

Torre

[11] Patent Number: 5,662,573

[45] Date of Patent: Sep. 2, 1997

[54] METAL INKING ROLL FOR USE IN FLEXOGRAPHIC PRINTING

[76] Inventor: Renato Della Torre, Via Di Vittorio 9, 21057 Olgiate Olona (Varese), Italy

[21] Appl. No.: 553,148

[22] Filed: Nov. 7, 1995

Related U.S. Application Data

[62] Division of Ser. No. 322,097, Oct. 12, 1994, Pat. No. 5,514,064, which is a continuation of Ser. No. 348,006, filed as PCT/EP88/00738, Aug. 18, 1988, abandoned.

[51] Int. Cl.[6] ........ F16C 13/00

[52] U.S. Cl. ........ 492/31; 492/49; 82/1.11; 148/222; 148/233; 29/895.3

[58] Field of Search ........ 492/31, 49, 32; 82/1.11; 79/895.3; 148/222, 223; 29/895.3, 895.33, 895.31, 895.32

[56] References Cited

U.S. PATENT DOCUMENTS

| | | | |
|---|---|---|---|
| 1,499,100 | 6/1924 | Elstrom | 72/34 |
| 1,817,435 | 8/1931 | Freuder | 492/31 |
| 1,840,237 | 1/1932 | Leighton | 72/34 |
| 2,726,703 | 12/1955 | Fultz . | |
| 3,103,963 | 9/1963 | Dove | 72/34 |
| 3,323,983 | 6/1967 | Palmer et al. | 492/31 |
| 3,415,103 | 12/1968 | Crawford et al. | 72/389 |
| 3,988,955 | 11/1976 | Engel et al. | 148/222 |
| 4,124,199 | 11/1978 | Jones et al. . | |
| 4,194,930 | 3/1980 | Tanaka et al. | 148/222 |
| 4,537,127 | 8/1985 | Fadner et al. . | |
| 4,637,310 | 1/1987 | Sato et al. . | |
| 4,704,168 | 11/1987 | Salik et al. | 148/222 |
| 4,819,558 | 4/1989 | Counard | 101/348 |
| 5,176,760 | 1/1993 | Young | 148/222 |

FOREIGN PATENT DOCUMENTS

| | | | |
|---|---|---|---|
| 0190391 | 8/1986 | European Pat. Off. . | |
| 0001925 | 1/1980 | Japan | 148/222 |
| 551925 | 1/1980 | Japan . | |
| 48908 | 8/1989 | Japan | 72/34 |
| 49008 | 8/1990 | Japan | 72/34 |
| 5138216 | 6/1993 | Japan . | |
| 138216A | 7/1993 | Japan | 29/895.33 |
| 501062 | 2/1971 | Switzerland . | |
| 0501062 | 2/1971 | Switzerland | 148/222 |

*Primary Examiner*—Larry I. Schwartz
*Assistant Examiner*—Marc W. Butler
*Attorney, Agent, or Firm*—Gifford, Krass, Groh, Sprinkle, Patmore, Anderson & Citkowski, P.C.

[57] ABSTRACT

Metal inking rolls, particularly for flexographic printing, having: A roll structure composed of an ammonia hardenable steel, in particular stainless steel, the selection of a roll wherein the minimum thickness of the wall, if tubular, is a direct function of the diameter and an inverse function of the length of the roll, so that, when the roll is supported at its ends and stressed in the middle, on a surface relatively distributed, it may be permanently distorted in the axial direction but without distorting its cross-section; a post-engraving ionic nitriding treatment to increase the surface hardness of the screen to at least 60 HRC and a final straightening step, to reduce the screen eccentricity at least 0.02 mm.

2 Claims, 2 Drawing Sheets

METAL INKING ROLL FOR USE IN FLEXOGRAPHIC PRINTING

This application is a divisional of U.S. Ser. No. 08/322,097 filed on Oct. 12, 1994 now U.S. Pat. No. 5,514,064, issued May 7, 1996; which is a continuation of U.S. Ser. No. 07/348,006 filed Oct. 29, 1991 (now abandoned); which is the U.S. National Phase of PCT/EP88/00738 filed Aug. 18, 1988; and which is based on Italian patent application 83650A/87 filed on Aug. 20, 1987.

BACKGROUND OF THE INVENTION

The present invention relates to a process and apparatus for making metal inking rolls, particularly for use in flexographic printing. Said rolls are precisely screened, and have a highly hardened superficially engraved layer. Said rolls are produced by a simplified and improved manufacturing process which produces a roll with improved functionality and duration, Moreover, the present invention relates to rolls produced by said process and apparatus.

DESCRIPTION OF THE PRIOR ART

Presently, inking rolls are made in three different ways, Inking rolls made according to a first conventional method were of very high quality; however, they decayed after a relatively short period of time. Such inking rolls were traditionally made of metal and had an outer surface which was first mechanically engraved to form a screen of ink-collecting cells below the surface of the roll. Later, the rolls were galvanized with a layer of chrome, The thickness of the chrome layer, however, could not exceed a few microns and at maximum 15 microns since to increase the thickness of the plating would corrupt the integrity of the original unplated roll. Galvanizing the roll with chrome not only resulted in a harder roll but also served to prevent ink and/or other solvents from corroding the ink roll. However, a significant drawback of ink rolls made according to this first process is that they had a very short useful life; that is, their useful life was directly proportional to the thickness of the chrome plating since once the chrome plating wore away, the screened surface of the roll wore away thereby diminishing the capacity of the cells. In actual use, their useful life was further reduced as result of being continuously engaged by a metal doctor which was passed over the roll to remove excess ink from the surface of the roll. This constant engagement with the metal doctor also quickly wore down the very thin layer of chrome thereby resulting in a roll with a very short useful life. The metal doctor wore down the sharp projections of the screened surface which define the ink-collecting cells at a very high pressure due to the projections' small surface area. Consequently, the destructive nature of the metal doctor dictates that the rolls have eccentricities less than 20 microns; yet, even at this reduced level, poor inking and consequently poor printing results despite the fact that the rolls may be relatively new. This occurs for two reasons: first, the metal doctor intensely engages the rolls' screened surface which, as explained above, results in poor inking; and second the surface opposite to the screened surface only scarcely adhered to the flexographic cylinder and to the metal doctor. Moreover, these effects progressed as the destruction of the screens' cell walls reduced the ink capacity of the screened cells.

A second known process involved a complicated process of coating a metallic cylinder with a ceramic covering. The ceramic layer was grinded and then later laser engraved to form a screen. Laser engraving the ceramic rolls produced screened cells which were less precise than those of metal rolls; however, the ceramic rolls did have greater cell capacity. The ceramic covering layer had a thickness of 0.1 to 0.2 mm and was very hard; thus it lasted 5 to 10 times longer than rolls obtained according to said first known process. Although these rolls are of higher engraving quality, the cost of manufacturing them is much higher than that of rolls made according to the first described process. Moreover, they were excessively fragile; even slight contact with a small metal piece or the like could irreparably damage a very expensive ceramic roll.

According to a third known process, a steel roll was galvanized with an approximately 0.5 mm layer of copper. The plated roll was electronically engraved with a pointed tool made of diamond. This process resulted in a screen of cells with quality and characteristics substantially corresponding to those resulting from the first described process.

SUMMARY OF THE INVENTION

The invention, as claimed, is intended to remedy the aforementioned drawbacks. The inventor has conceived a simple and inexpensive process based on a preparatory step similar to that of the first described conventional process but resulting in a roll with a longer useful life than that of the roll produced according to the second process. Thus, the screen precision is maintained as provided by an engraving tool yet the screen is not altered or compromised by a chromium plating and/or by deformations from the impact of the engraving tool. In fact, according to the present invention, the roll is not hardened by adding an additional layer of metal. Rather, it is hardened by nitriding a roll itself made from a chromium-containing steel to a hardness degree comparable to that of ceramic rolls yet without the fragility of the same and at greater precision than any rolls obtained according to any of the three conventional processes described above. In accordance with the preferred embodiment of the present invention, ionic nitriding at a particularly low temperature is employed. Such nitriding includes several steps directed to keep roll distortion to a minimum. Distortion is eliminated by using a centering control device which is adapted to provide the necessary corrections, generally reducing distortion to within tolerable limits. Although the nitriding hardening process is in itself known, nitriding hardening has never been used in screened inking roll production. In fact, simple nitriding did not obtain any result as the inventor's experimentation showed. However, the results obtained according to the process disclosed herein requires nitriding hardening in conjunction with proper selection and size of materials; particular engraving, conditioning, and heating techniques; as well as assiduous testing and correction by using an apparatus particularly adapted for testing and correcting surface deformations. Although some components of the whole process are more significant than others and concomitance of each of them gives the optimal result, the lack of even one of them could be decisive, depending on the particular operating condition. Particularly important to the process of making metal inking rolls according to the present invention is that the selection of nitride hardenable steel is made from among stainless steels capable of reaching through nitriding a surface hardness of 60 HRC. Particularly adapted to this end is a 420 AISI stainless steel containing 12–15% chromium, since it is capable of attaining a surface hardness of 77 HRC through nitriding. Also particularly important is the ability to assiduously intervene with testing and corrective means to affect the shape and centering of the roll. This includes selecting a low temperature nitriding hardening process, whereby deformations are eliminated or contained in a range which is easily controllable by the apparatus claimed as part of the present invention. Said apparatus employs a hydraulic bridge press in combination with a frame which can support and rotate the roll. Moreover, the frame and press as a unit are capable of moving back and forth. The present invention also implements means to control the descent of the roll which includes programmed and programmable electronic circuitry operating relative to the eccentricity of the roll. In order for the machine to effectuate the necessary corrections on the rolls, it is necessary to calibrate it with respect to either solid blank or to a tubular roll of properly selected wall thickness, so that the machine eliminates undesirable imperfections in the roll surface but does not compromise the roll's cross-sectional shape.

BRIEF DESCRIPTION OF THE DRAWINGS

The various features and advantages of the present invention will become more apparent by referring to the following detailed description and drawings.

DETAILED DESCRIPTION OF THE PREFERRED EMBODIMENTS

Figure 1:
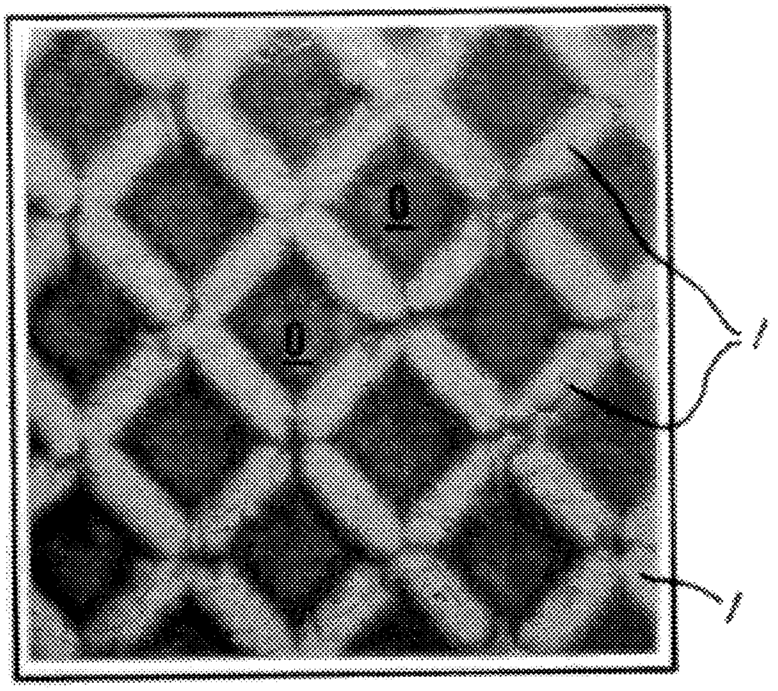
FIG. 1 is a micro-photograph, magnified 250×, of a screen for a conventional inking roll for flexography with 19,600 cells/cm$^2$, mechanically produced on a steel substratum with a chromium plating layer of 15 microns thick.

Methods of carrying out the present invention are described in detail below through three examples, Examples I, II, III, and with reference to characters and lines which illustrate specific embodiments thereof.

EXAMPLE I

To make three screened inking rolls for flexographic printing, each with a diameter of 100 mm and a length of 1170 mm, three different nitridable steel bars were used. The first was UNI 30 Cr, Mo 10; the second was UNI 40 Cd 4; the third was UNI Lf 2. Each of the bars had an initial diameter of 110 mm and a length of 1470 mm. Each bar was tempered according to the following procedure: heating to 1000° C. in air and tempering to 630° C., followed by cooling in an oven. Then, each was rough-turned to a diameter of 102 mm and the roll bosses were provided. At the end of rough-turning, a new stabilization was executed, according to the following heating procedure: heating to 600° C. with cooling in an oven. Then, each roll was turned to size with grinding finish. Each roll had a resistance of 75 Kg/cm$^2$. A die was used to mechanically engrave each of the rolls. The die had a screen of 120 cells per linear centimeter. The engraving was performed in a single run at a speed of 20 r.p.m., a pressure of about 10.00 Kg/cm$^2$, for about 10 hours. After the engraving, the eccentricity of each roll was tested. The first roll had an eccentricity of 0.35 mm at the center of the roll. The second roll had an eccentricity of 0.07 mm and the third, an eccentricity of 0.02 mm. The first was discarded while the two remaining rolls were subjected to gaseous nitriding. The second and third rolls were vertically hung in a suitable oven at a temperature of 500° C. for 15 hours in an atmosphere of hydrogen nitrogen. They were subsequently cooled in an oven. Once they were cooled, their hardness was tested. The second roll had a hardness of 60 HRC while the third had a hardness of 63 HRC, which substantially corresponds to the hardness of chromium-plated conventional rolls. The eccentricity of the second and third rolls was then measured. For the second roll, the eccentricity was 0.12 mm, while the third had an eccentricity of 0.075 mm. The nitrided and engraved surface was tested at several points on the screen. It was observed that both rolls had changed from shiny and poreless to opaque and porous. Due, in part, to the poor finish on the screen surface, even the second and third rolls had to be discarded.

EXAMPLE II

To make two screened inking rolls for flexographic printing each having a diameter of 100 mm and a length of 1170 mm, two nitridingable steel bars were used. The first was UNI Lf 2, and the second UNI 31 Cr, Mo V 9. Each had an initial diameter of 110 mm and a length of 1470 mm. Each was tempered according to the following procedure: heating to 1000° C. in air and tempering to 630° C. and successive cooling in an oven. Both were then rough turned to a diameter of 102 mm and the bosses thereof were provided. After the rough-turning, a new stabilization was executed according to the following heating procedure: heating to 600° C. with cooling in an oven. Then, each roll was turned to size, with grinding finish. The resistance of each was then measured to be 75 Kg/cm$^2$ for both. The surfaces of both pieces were ground prior to engraving. A die was used to mechanically engrave each of the rolls. The die had a screen of 120 cells per linear centimeter. The engraving was performed in a single run at a speed of 20 r.p.m., a pressure of about 10.00 Kg/cm$^2$, for about 10 hours, with a feeding pitch of about 80 microns. After the engraving, the eccentricity of each roll was tested. The first roll had an eccentricity of 0.03 mm at the center of the roll. The second roll had an eccentricity of 0.02 mm. Both rolls were subjected to ionic nitriding. The rolls were hung vertically in a suitable oven, in a plasma ambience of high intensity nitrogen with other filling, at a temperature of 400° C. for 11 hours and then cooled in an oven. After they were cooled, the hardness of each roll was 65 HRC which is even higher than that of chromium plated rolls. The eccentricity of the first roll was 0.06 mm while the eccentricity of the second roll was 0.07 mm. The engraved and nitrided surfaces were tested at several points on the screen. It was observed that both rolls remained shiny and poreless. Because a roll's lack of precision is the only obstacle to obtaining rolls in a high quality range, both rolls were subjected to straightening according to the present invention. The straightening reduced the eccentricity of the first roll to 0.015 mm and the second roll to 0.018 mm. Both rolls were tested for printing and proved to be better than plated conventional rolls, even at the beginning of use, though they were subject to a very slow degradation due to slight oxidation and corrosion, though strongly contrasted by nitriding, as well as by a hardness which was not exceptionally high.

EXAMPLE III

To make two screened inking rolls for flexographic printing each with a diameter of 100 mm and a length of 1170 mm, two stainless steel bars, both with AISI 420 denomination were used. Each of the bars had an initial diameter of 110 mm and a length of 1470 mm. Each bar was tempered according to the following procedure: heating to 1000° C. in air and tempering to 630° C., followed by cooling in an oven. Then, each was rough-turned to a diameter of 102 mm and the roll bosses were provided. At the end of rough-turning, a new stabilization was executed, according to the following heating procedure: heating to 600° C. with cooling in an oven. At the end of this cycle, each roll was turned to size with grinding finish. Each roll had a resistance of 80 $Kg/cm^2$. A die was used to mechanically engrave each of the rolls. The die had a screen of 120 cells per linear centimeter. The engraving was performed in a single run at a speed of 20 r.p.m. with a feeding pitch of about 80 microns, a pressure of about 12.00 $Kg/cm^2$, for about 10 hours. After the engraving, the eccentricity of each roll was tested. The first roll had an eccentricity of 0.015 mm at the center of the roll. The second roll had an eccentricity of 0.02 mm. Both rolls were ionic nitrided according to the present invention. The rolls were hung vertically in a suitable oven, in a plasma ambience of high intensity nitrogen with other filling, at a temperature of 400° C. for 9 hours and then cooled in an oven. After they were cooled, the hardness of each roll was 72 HRC which is substantially the same as that of ceramic rolls. The eccentricity of the first roll was 0.04 mm while the eccentricity of the second roll was 0.03 mm. The engraved and nitrided surfaces were tested at several points on the screen. It was observed that both rolls remained very bright, absolutely poreless having cells with sharp-cornered shapes and perfect definition. Because a roll's lack of precision is the only obstacle to obtaining rolls in a high quality range, both rolls were subjected to straightening according to the present invention. The straightening reduced the eccentricity of each roll to 0.01 mm, an acceptable tolerance. Both rolls were tested for printing and gave very high results in the categories of duration and inking flexibility, even in comparison to printing obtained from chromium plated rolls, i.e. completely without imperfections and with consistent results.

A comparison was made between the data regarding conventional available rolls and those obtained according to the present invention. Marks of merit representing the quality of various features of the roll were made on a scale of 1–10, 10 being the highest quality. The results are presented in Table I. The marks of merit of the rolls made according to the present invention are substantially empirical but abundantly confirmed by practical testing. For example, in the most significant category, screen finishing and printing quality, rolls made according to the present invention are 20% improved over the conventional chromium plated roll.

Figure 2:
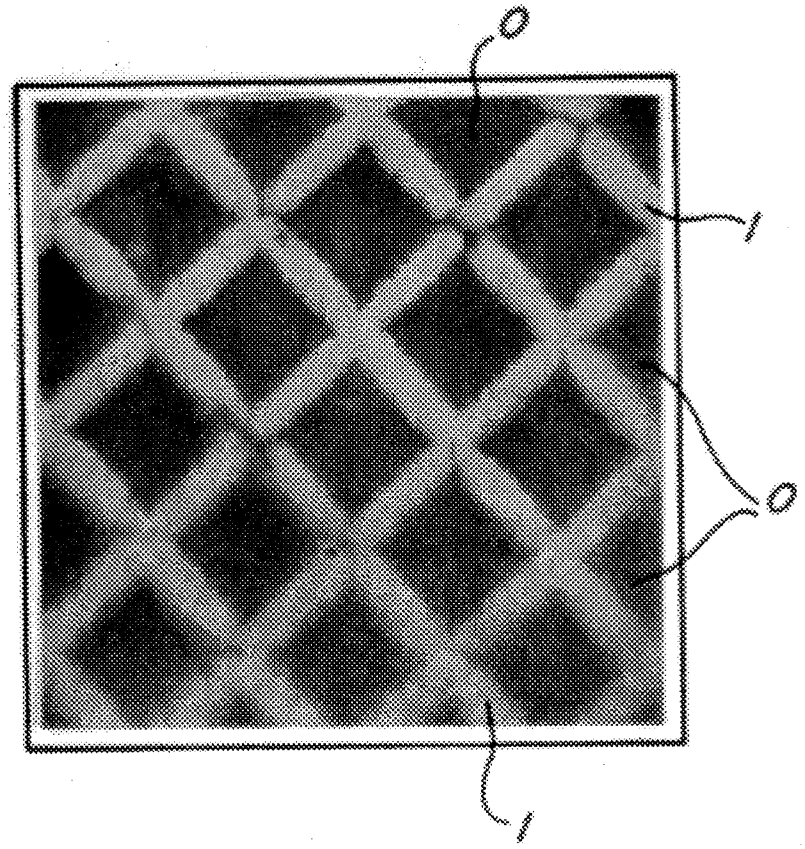
FIG. 2 is a micro-photograph, magnified 250×, of a screen for inking rolls for flexography with 19,600 cells/cm$^2$, produced according to the process set forth in Example III. Test results for this screen are reported at the last line of Table 1.

Referring now to FIGS. 1 and 2, the cell sizes of the screens were compared and it was observed that the cells' capacity for containing ink or the like of the screen of FIG. 2 was 20% superior to that of FIG. 1. This calculation was based on the ratio 0-hollow: 1-solid. It was also noted that the screen of FIG. 2 was sharper and neater, with more defined corners, less superficial cracks and thinner walls than the conventional screen of FIG. 1. Data corresponding to the screen of FIG. 1 is presented at the second line of Table I.

Before explaining the straightening operation, it must be pointed out that straightening can be performed on rolls with screens which are pretreated by nitriding. Said treatment may be used at a condition known to eliminate constitutional eccentricity as well as those resulting from the heat treatment. However, even the straightening operation must be effective and provide a permanent distortion in a direction exactly opposite to that of a rise, thereby substantially eliminating it. Said permanent distortion is provided by operating on a sufficiently large surface so as not to damage the screen or to deform the cross section of the roll locally, rather than simply eliminating or correcting the rise. To alleviate distortion that occurs when inking rolls are produced from solid cylinders, tubular blanks may be used, having a minimum thickness directly proportional to the diameter and inversely proportional to the length so that when the roll is supported at both ends and stressed in the middle on a surface relatively distributed, it may be permanently distorted in an axial direction rather than at the transverse or cross-section.

Figure 3:
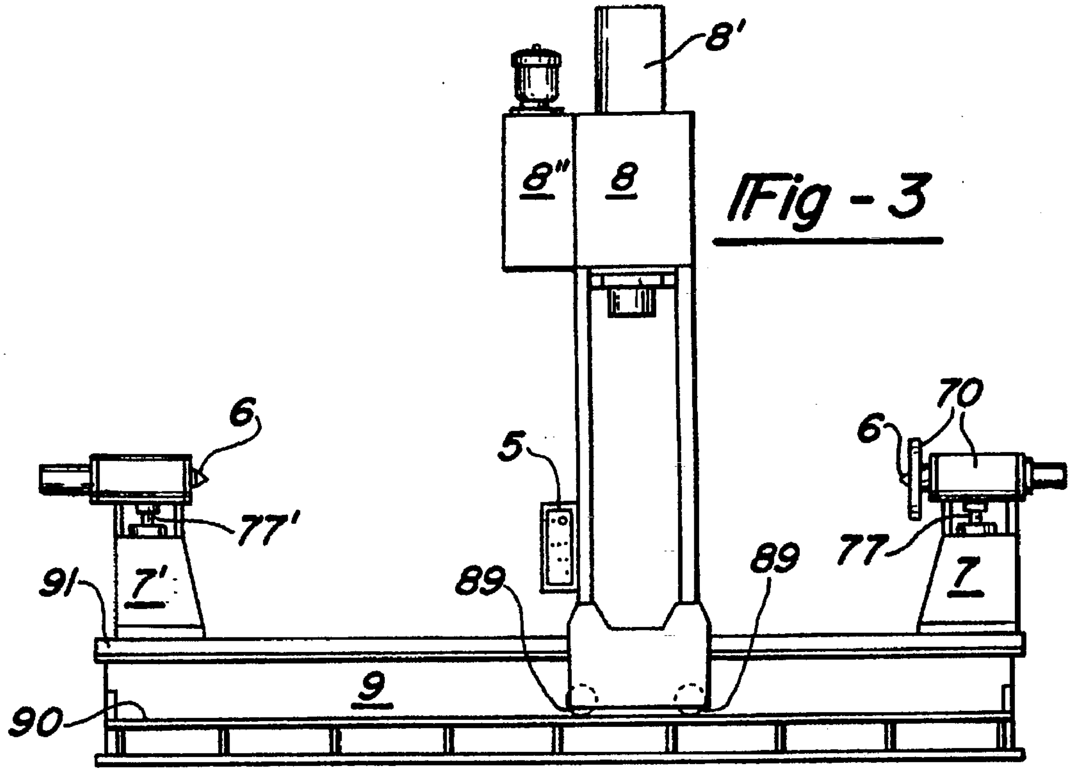
FIG. 3 is a front-view of a bridge press for providing the straightening operation according to the present invention and as set forth in Examples I–III.
Figure 4:
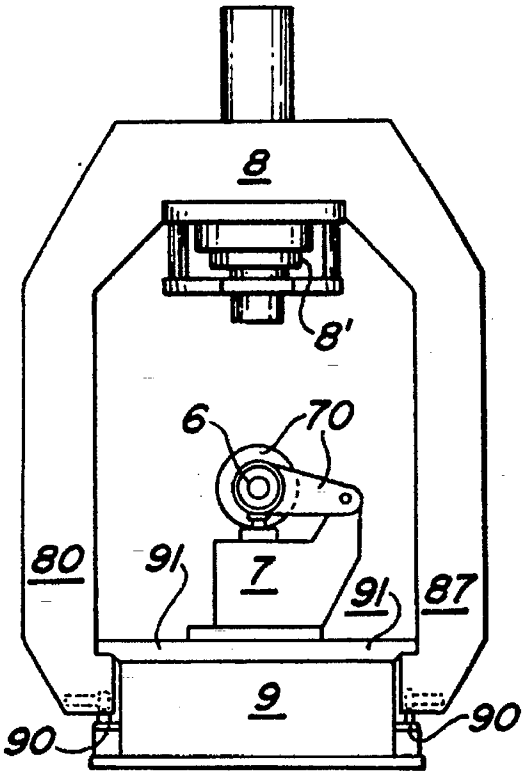
FIG. 4 is a side-view of the bridge press of FIG. 3.

Referring now to FIGS. 3 and 4, the straightening means will be described. The straightening means depicted in FIGS. 3 and 4 comprises a frame 9 in the form of a lathe bed with longitudinal guides 90 and 91. The side guides 90 are engaged by a first side arm 80 and a second side arm 81 of bridge press 8. The bridge press 8 is comprised of a pressing unit 8' driven by pumping station 8". The pressing unit 8' may slide longitudinally on wheels 89 which roll on guides 90. On the upper guide 91, each of the stock units 7, 7' may be slided there along. Stock unit 7 is a driver and includes a catch plate head 70 to rotate a roll (not shown) to be straightened, to test its eccentricity and to localize it. The other unit 7' is substantially a tailstock. Both stock units 7, 7' have cylinder-piston units 77, 77' respectively, connected to a pumping station (not shown). The roll (not shown) to be straightened, is mounted between the centers 6, and its eccentricity is tested at several points, drawing a suitable map. The control panel 5 of the machine monitors such eccentricity and controls the correction of it. The direct pressure on the roll is provided through a concave half bush made of soft metal such as copper.

The invention being thus described, it will be obvious that the same may be varied in many ways. Such variations are not to be regarded as a departure from the spirit and scope of the invention, and all such modifications are intended to be included within the scope of the following claims.

TABLE I

| No | Kind | Material | Treatment: Heating | Treatment: Galvanic | Treatment: Mechanic: Incision | Treatment: Mechanic: Straightening | Precision | Hardness | Eccentricity | Life | Screen Finishing or Printing | Cost |
|---|---|---|---|---|---|---|---|---|---|---|---|---|
| 1 | Laser | Ceramic | No | No | No | No | 8 | 10 | 9 | 10 | 7–8 | 10 |
| 2 | Mechanic | Fe Chrome plated | Yes-No | Yes | Yes | Yes | 8 | 6 | 8 | 2 | 8–9 | 2.5 |

TABLE I-continued

| | | | Treatment | | | | | | | | Screen | |
|---|---|---|---|---|---|---|---|---|---|---|---|---|
| | | | | | Mechanic | | Preci- | Hard- | Eccen- | | Finishing or | |
| No | Kind | Material | Heating | Galvanic | Incision | Straightening | sion | ness | tricity | Life | Printing | Cost |
| 3 | Mechanic | Cu | No | Yes | Yes | No | 8 | 6 | 9 | 2 | 8–8 | 3.5 |
| 4 | Mechanic | Ordinary steel | Yes | No | Yes | Yes | 5 | 5 | 9 | 3 | 7 | 3 |
| 5 | Mechanic | Chrome alloyed steel | Yes | No | Yes | Yes | 10 | 9 | 9 | 9 | 9–10 | 7 |

I claim:

1. A metal inking roll for use in flexographic printing, said inking roll having a surface hardness of up to 77 HRC, an eccentricity lower than 0.02 mm, and a nitrided surface, wherein said roll is further mechanically engraved to produce a screen on a surface of said roll.

2. The metal inking roll as described in claim 1, further comprising straightening means for providing a permanent distortion in a direction opposite to a rise in said metal inking roll which is indicative of an eccentricity in said inking roll.

* * * * *

UNITED STATES PATENT AND TRADEMARK OFFICE
CERTIFICATE OF CORRECTION

PATENT NO. : 5,662,573
DATED : September 2, 1997
INVENTOR(S) : Renato Della Torre It is certified that error appears in the above-indentified patent and that said Letters Patent is hereby corrected as shown below:

Column 7:
In Table I, under the sub-heading "Material", the first line, after "Cu", insert --Chrome Plated--.

Signed and Sealed this
Twenty-fourth Day of March, 1998

Attest:

BRUCE LEHMAN

*Attesting Officer* *Commissioner of Patents and Trademarks*